Patented Aug. 28, 1928.

1,682,062

UNITED STATES PATENT OFFICE.

MAX BOCKMÜHL, RUDOLF SCHWABE, AND GUSTAV EHRHART, OF HOCHST-ON-THE-MAIN, GERMANY, ASSIGNORS, BY MESNE ASSIGNMENTS, TO WINTHROP CHEMICAL COMPANY, OF NEW YORK, N. Y., A CORPORATION OF NEW YORK.

SOPORIFICS CONTAINING AT LEAST ONE ALKINYL GROUP.

No Drawing. Application filed December 15, 1926, Serial No. 155,097, and in Germany June 11, 1925.

Since the discovery of diethylbarbituric acid by Emil Fischer frequent and partly successful attempts have been made to vary the alkyl groups situated in five-position in the barbituric acid ring. Thus the ethyl groups were, for instance, replaced partly by the phenyl or cyclohexyl group, partly by higher alkyl groups. Of late years, barbituric acids of a great efficacy have been prepared containing an alkyl group and an alkylene group such for instance as isopropylallylbarbituric acid and isopropylbromopropenylbarbituric acid. In spite of numerous and extensive researches on the subject, soporifics containing an alkyl group with a triple linkage have not yet been disclosed. This is probably due to the fact that in introducing a radical with a triple linkage by means of the esters of alkinols (i. e., alcohols containing alkinyl radicals, which latter, according to the Genevan Nomenclature as described in Beilstein's "Handbuch," ed. 4, vol. 1, page 53, are radicals of the type $HC\equiv C-CH_2-$), as for instance propargylbromide or the like, undesirable secondary reactions were to be apprehended in view of the well-known reactivity of such bodies. Furthermore, the well-known toxicity of numerous bodies, with a triple linkage discouraged the attempts to synthesize bodies of this type.

We have now found that compounds of excellent soporific properties can be obtained by wholly or partly replacing in the usual alkylation methods for preparing soporifics the esters of the saturated alcohols by esters of the alkinols. When starting for instance from monoalkylmalonic esters, alkylalkinylmalonic esters are obtained which can be converted by means of urea and alkylates into the corresponding barbituric acid compounds. The same substances may be obtained by causing the esters of the alkinols to act upon the monoalkylbarbituric acid salts. According to the process of our present invention, there may also be prepared compounds containing an alkenyl group (i. e., group of the type $H_2C=CH-CH_2-$) and an alkinyl group e. g., allylpropargylbarbituric acid.

An extensive physiological investigation has proved that the new compounds are soporifics of an excellent efficacy. They are capable of inducing sleep very soon without there being any symptoms indicating intoxications. No dullness, fatigue nor any other bad after-effects have been observed.

The following examples serve to illustrate our invention, but they are not intended to limit it thereto:

1. 17 g. of isopropylbarbituric acid are dissolved in 11.3 g. of concentrated caustic soda solution of 35% strength and 60 g. of alcohol of 50% strength; there are then added 12 g. of 3-bromopropine (1) and the whole is boiled for five hours. The alcohol is then distilled off and the residue is mixed with water. The separated isopropylpropargylbarbituric acid having most probably the formula:

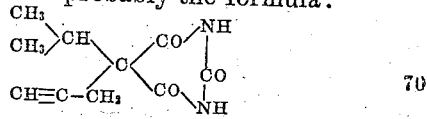

is filtered by suction, washed and recrystallized from water. The substance thus obtained melts at 165° C. and is readily soluble in ether, alcohol and hot water. By the addition of permanganate the compound is instantaneously decolorized.

When starting from the hydrobromic ester of butin-2-ol (see "Berichte der deutschen chemischen Gesellschaft" volume 51, page 383) obtainable from butinol by the action of hydrobromic acid, isopropylmethylpropargylbarbituric acid is produced by the same process.

2. 41 g. of isopropylbarbituric acid are dissolved in the calculated quantity of caustic soda solution of 5% strength. To this solution added 39 g. of isopropenylpropargyl bromide dissolved in 160 ccm. of alcohol. The mass is allowed to stand for 10 hours at room temperature and is then heated to 50° C. for 10 hours. After having distilled off the alcohol in a vacuum, isopropenylpropargylisopropylbarbituric acid, having most probably the formula:

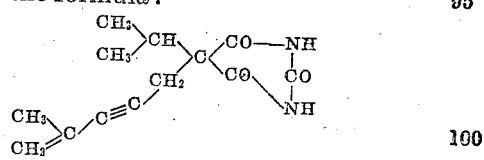

remains in the form of a solid cake. When redissolved in alcohol this acid has its melting point at 157° C.

The isopropenylpropargylbromide was produced in the following manner:

Into a solution prepared according to Grignard's reaction from 40 g. of magnesium, 210 g. of ethyl bromide and 500 ccm. of ether, are run drop by drop, while cooling with ice, 120 g. of isopropenylacetylene (obtainable from methyl butinol by the elimination of water) dissolved in 90 ccm. of ether. After 2 hours the cooling is discontinued, the mass is stirred first for 6 hours at room temperature and finally for 1 hour under reflux. The mass is then again thoroughly cooled and formaldehyde, prepared by heating 85 g. of absolutely dry para-formaldehyde, is then introduced into the etherial solution of the isopropenylpropargylmagnesiumbromide under reflux and while stirring. After having decomposed the reaction product with water and acidified with diluted sulfuric acid, the etherial layer is separated and dried over potassium carbonate. After having distilled off the ether the isopropenylpropargyl alcohol boils at 68–69° C. under 11 mm. pressure. 30 g. of the alcohol thus obtained are mixed with 100 g. of methylene chloride and into this mixture are introduced drop by drop 28.2 g. of phosphorus tribromide while stirring and well cooling. After 2 hours the mass is shaken with ice water and the methylene chloride is distilled off. The resulting isopropenylpropargylbromide melts at 65–67° C. under 20 mm. pressure.

3. To a solution of 198 g. of diethylmethinbarbituric acid in alcohol is added a solution of 23 g. of sodium in alcohol and the said acid is converted into the sodium salt. There are then added 119 g. of propargylbromide and the whole is heated in a closed vessel for about 8 hours to 120° C.

After having distilled off the alcohol, the residue is dissolved in water and the resulting propargyldiethylmethinbarbituric acid, having most probably the formula:

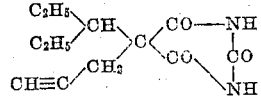

is precipitated by means of concentrated hydrochloric acid, then washed with cold water and repeatedly recrystallized from dilute alcohol.

The substance thus obtained melts at 175–178° C. and is soluble in alcohol and ether, difficultly soluble in water.

We claim:

1. As new products, soporifics being derivatives of barbituric acid and containing at least one alkinyl group in the five position of the barbituric acid ring, corresponding to the general formula:

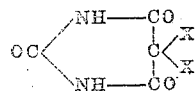

wherein X means an alkyl, alkenyl, alkinyl or phenyl group, but at least one X being an alkinyl group.

2. As new products, soporifics being derivatives of barbituric acid and containing at least one propargyl group in the five position of the barbituric acid ring, corresponding to the general formula:

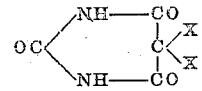

wherein X means an alkyl, alkenyl, alkinyl or phenyl group, but at least one X being a propargyl group.

3. As new soporifics, isopropylpropargylbarbituric acids of the type:

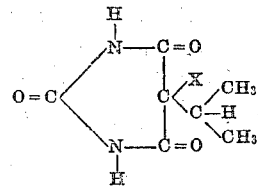

wherein X means an alkinyl group.

4. As a new soporific, isopropylisopropenylpropargylbarbituric acid of the following formula:

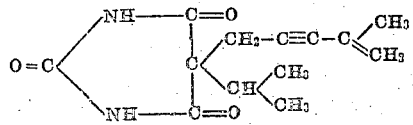

In testimony whereof, we affix our signatures.

Dr. MAX BOCKMÜHL.
Dr. RUDOLF SCHWABE.
Dr. GUSTAV EHRHART.